(12) United States Patent
Lin et al.

(10) Patent No.: US 11,023,431 B2
(45) Date of Patent: Jun. 1, 2021

(54) SPLIT DATA MIGRATION IN A DATA STORAGE SYSTEM

(71) Applicant: INTERNATIONAL BUSINESS MACHINES CORPORATION, Armonk, NY (US)

(72) Inventors: Edward H. Lin, Tucson, AZ (US); Joseph M. Swingler, Phoenix, AZ (US); Robert S. Gensler, Jr., Beavercreek, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 116 days.

(21) Appl. No.: 16/455,544

(22) Filed: Jun. 27, 2019

(65) Prior Publication Data

US 2020/0409913 A1    Dec. 31, 2020

(51) Int. Cl.
*G06F 16/21*    (2019.01)

(52) U.S. Cl.
CPC .................................. *G06F 16/214* (2019.01)

(58) Field of Classification Search
None
See application file for complete search history.

(56) References Cited

U.S. PATENT DOCUMENTS

| | | | |
|---|---|---|---|
| 8,234,471 B2 | 7/2012 | Ito et al. | |
| 8,468,133 B2 | 6/2013 | Chiu et al. | |
| 8,473,465 B2 | 6/2013 | Petruzzo | |
| 9,229,661 B2 | 1/2016 | Rehm et al. | |
| 9,323,758 B1 | 4/2016 | Stacey et al. | |
| 9,344,498 B2 | 5/2016 | Clayton et al. | |
| 9,495,262 B2 | 11/2016 | Miller et al. | |
| 9,563,452 B2 | 2/2017 | Hudzia et al. | |
| 2009/0300283 A1 | 12/2009 | Kudo | |
| 2012/0203999 A1 | 8/2012 | Jess | |
| 2015/0205674 A1 | 7/2015 | Schroth et al. | |
| 2017/0010826 A1 | 1/2017 | Basham et al. | |
| 2017/0161349 A1 | 6/2017 | Harris, Jr. et al. | |
| 2017/0262346 A1 | 9/2017 | Pradhan et al. | |
| 2018/0267723 A1 | 9/2018 | McBride et al. | |

(Continued)

OTHER PUBLICATIONS

Seipp, et al., "Multi-cloud with Transparent Cloud Tiering", IBM Corporation, 2018, pp. 38.

(Continued)

*Primary Examiner* — Christopher J Raab
(74) *Attorney, Agent, or Firm* — Konrad Raynes Davda & Victor LLP; William K. Konrad

(57) ABSTRACT

In one embodiment of split data migration in accordance with the present description, to migrate the data of a volume or other data unit which has been previously mirrored from a primary data storage system to a secondary data storage system, the data unit is split into two or more parts. One part is migrated from the primary data storage system to a migration target storage system, and another part is migrated from the secondary data storage system, to the same, common migration target storage system. In this manner, the migration workload of migrating a unit of data may be split between the primary and secondary storage systems, reducing the impact of migration data processing upon the primary storage system and reducing migration time. Other features and aspects may be realized, depending upon the particular application.

21 Claims, 8 Drawing Sheets

(56) References Cited

U.S. PATENT DOCUMENTS

2018/0357246 A1 12/2018 Strogov et al.
2020/0034077 A1 1/2020 Haravu et al.
2020/0142595 A1 5/2020 Chan
2020/0379647 A1 12/2020 Ikeda

OTHER PUBLICATIONS

Yudenfreund, "Enhancing Value to Existing and Future Workloads with IBM z13" IBM Corporation, Redbooks, 2015, pp. 9.

Stanley, "IBM DS8870 Multiple Target Peer-to-Peer Remote Copy", IBM Corporation, Redbooks, Document No. REDP-5151-00, Feb. 2015, pp. 126.

List of IBM Patents and Applications Treated as Related, dated Mar. 13, 2020, pp. 2.

U.S. Appl. No. 16/792,032, filed Feb. 14, 2020.

U.S. Appl. No. 16/792,061, filed Feb. 14, 2020.

B. Calder, et al., "Windows Azure Storage: a highly available cloud storage service with strong consistency". Proceedings of the Twenty-Third ACM Symposium on Operating Systems Principles, 2011, pp. 143-157.

J.G. Biondo, Jr., et al., "IBM DS8880 and z/OS DFSMS: Transparent Cloud Tiering", IBM Corporation, IBM Redbooks, Document No. SG24-8381-01, Apr. 2018, pp. 98.

Notice of Allowance, dated Apr. 9, 2021, U.S. Appl. No. 16/792,032, filed Feb. 14, 2020, Total 22 pages.

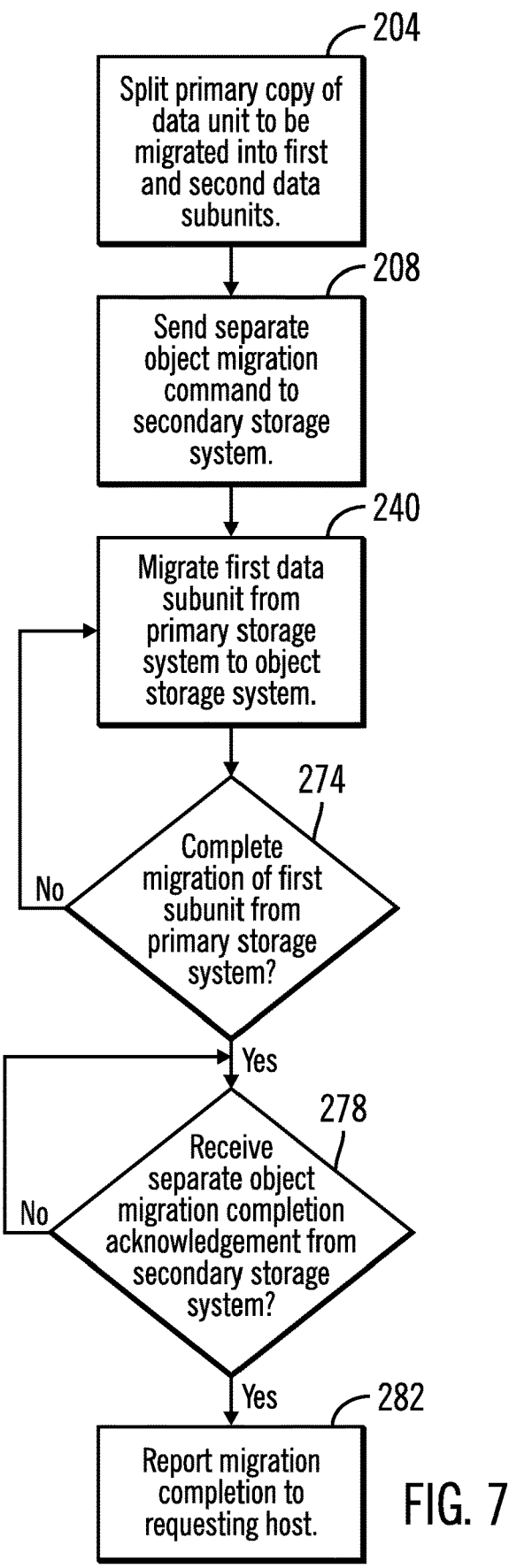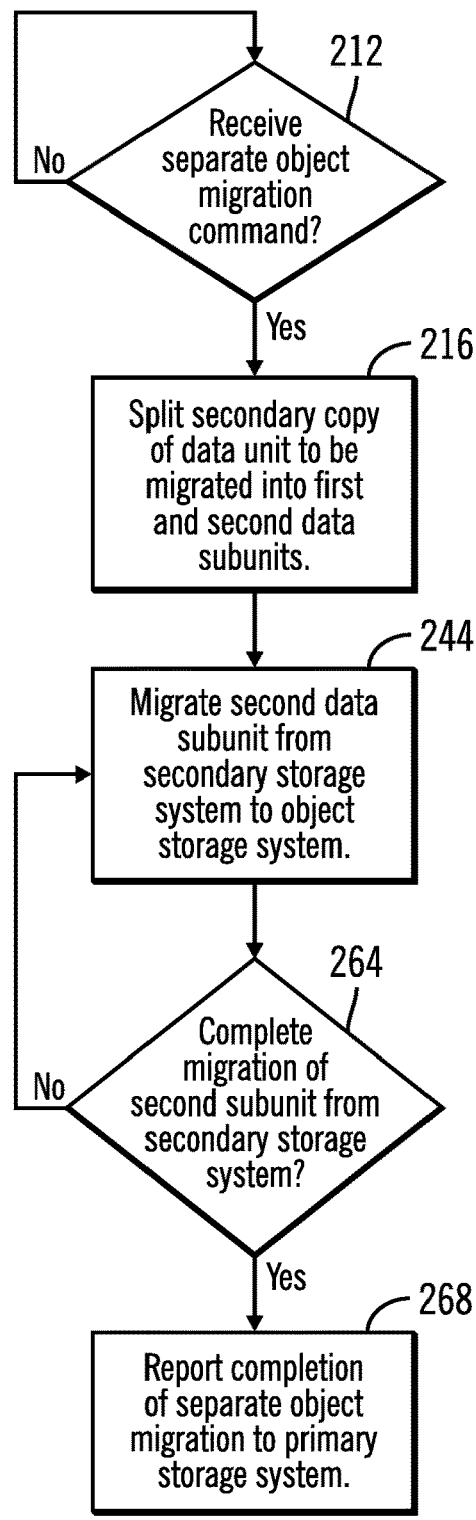
FIG. 7
FIG. 8

SPLIT DATA MIGRATION IN A DATA STORAGE SYSTEM

BACKGROUND OF THE INVENTION

1. Field of the Invention

The present invention relates to a computer program product, apparatus, system, and method for split data migration in data storage systems.

2. Description of the Related Art

Data backup systems can provide continuous availability of production data in the event of a sudden catastrophic failure at a single point in time or data loss over a period of time. In one such disaster recovery system, production data from a host is stored at a primary or local site, and is then replicated from the local site to a remote site which may be separated geographically by several miles or more from the local site. Such dual, mirror or shadow copies are typically made in a secondary storage device at the remote site, as an application system on a host is writing new data to a primary storage device usually located at the local site. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror Copy.

In addition to mirroring data from a primary site to a secondary site, data may also be migrated to different tiers of storage. For example, data may initially be stored at a relatively fast, relatively expensive upper tier of storage, to provide ready access to the data. Examples of such upper tier storage include solid state drives and hard disk drives which may be relatively close geographically to the source of the data. However, as the need for ready access to the data declines, the data may be migrated to a different, lower tier of storage which may be relatively slow but less expensive. Examples of such lower tier storage include tape drives and cloud storage which is often an object storage system and may be relatively distant geographically from the source of the data.

In many data storage systems, data is stored in a unit of data such as a volume, for example, which is accessible by a host. In data mirroring systems, data is typically maintained in volume pairs, comprising a primary volume in a primary storage device and a corresponding secondary or target volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices. In certain storage system environments, a storage controller (or a storage controller complex) comprises a plurality of storage servers that are coupled to each other. The storage controller allows host computing systems to perform input/output (I/O) operations with storage devices controlled by the storage controller, where the host computing systems are often referred to as hosts.

A volume accessible to a host is often referred to as being "online" to that host. To migrate a volume to another tier of storage, the host typically reads the data from the online volume and causes it to be written to another tier of storage such as a tape drive or cloud storage, for example. However, in various known mirroring systems, the host may not have access to volumes stored in the secondary storage device, for example, and thus are offline with respect to the host. As a result, the host typically cannot read the data of an offline volume and migrate the data of the offline volume to another tier of storage.

In one known migration systems marketed as "DS8000 Transparent Cloud Tiering" data may be migrated in a direct asynchronous movement from a storage device to another storage tier such as an object storage system, for example, without the need for a host to first read the data. As a result, not only may an offline volume located on a primary storage system be migrated to another tier of storage, but an offline volume located on a secondary storage system may also be migrated to another tier of storage.

SUMMARY

Split data migration in a data storage system in accordance with one aspect of the present description provides a significant improvement in computer technology. In one embodiment of such a data storage system, data of a unit of data is copied from primary storage system to secondary storage system to form a primary copy of the unit of data stored at the primary storage system and a secondary copy of the unit of data stored at the secondary storage system. In one aspect, split data migration is performed by splitting the primary copy of the unit of data stored at the primary storage system into subunits of data including first and second subunits of the primary copy of the unit of data stored at the primary storage system, and splitting the secondary copy of the unit of data stored at the secondary storage system into subunits of data including first and second subunits of the secondary copy of the unit of data stored at the secondary storage system data.

The data of the first subunit of the primary copy of the unit of data is migrated from the primary storage system as a first object to a migration target storage system, and the data of the second subunit of the secondary copy of the unit of data is migrated from the secondary storage system as a second object to the migration target storage system so that all of the data of the unit of data is migrated to the migration target storage system as separate objects including the first object containing data of the first subunit of the primary copy of the unit of data migrated from the primary storage system and the second object containing data of the second subunit of the secondary copy of the unit data migrated from the secondary storage system.

As a result, the migration workload of migrating a unit of data may be split between the primary and secondary storage systems, reducing the impact of migration data processing upon the primary storage system and enhancing the response time of the primary data storage system in processing other storage system tasks such as processing host initiated I/Os and mirroring other data to the secondary data storage system. In addition, split data migration in accordance with the present description can reduce the time required to migrate a unit of data since the resources of both the primary and secondary storage systems may be utilized in parallel and at the same time to migrate the unit of data in separate parallel and simultaneous migrations of data subunits of the data unit being migrated.

In another aspect of split data migration in a data storage system in accordance with the present description, a migration command is received from a host to migrate the unit of data to the migration target storage system, and in response to the migration command, a determination is made as to whether a storage system which includes the primary and secondary storage systems has a capability to perform split data migration. In one embodiment, such a determination includes determining whether the unit of data has been mirrored from the primary storage system to the secondary storage system to form the primary copy of the unit of data stored at the primary storage system and the secondary copy of the unit of data stored at the secondary storage system, and determining whether the primary and secondary storage systems are each coupled to the same migration target storage system. As a result, split data migration may be selectively employed as a function of various conditions in which split data migration may be advantageously employed.

In another aspect of split data migration in a data storage system in accordance with the present description, results of a determination of whether a storage system which includes the primary and secondary storage systems has the capability to perform split data migration includes receiving a further migration command from a host to migrate a unit of data to the migration target storage system, and in response to the further migration command, determining whether the storage system has the capability to perform split data migration as a function of cached determination results. In this manner, repeat determinations of whether a storage system has the capability to perform split data migration may be reduced thereby increasing efficiency of split data migration in one embodiment.

In yet another aspect of split data migration in a data storage system in accordance with the present description, a migration command is received from a host to migrate the unit of data to the migration target storage system and in response to the migration command, the primary storage system migrates data of the first subunit of the primary copy of the unit of data from the primary storage system as the first object to migration target storage system, and the primary storage system issues a separate object migration command to the secondary storage system. In response to the separate object migration command, the secondary storage system migrates data of the second subunit of the secondary copy of the unit of data from the secondary storage system as the second object to the migration target storage system, and upon completion of the migration of the second subunit of the secondary copy of the unit of data from the secondary storage system to the migration target storage system, the secondary storage system reports in a completion report to the primary storage system, completion of the migration of the second subunit of the secondary copy of the unit of data from the secondary storage system to the migration target storage system. Upon receipt of the completion report from the secondary storage system, and upon completion of the migration of the first subunit of the primary copy of the unit of data from the primary storage system to the migration target storage system, the primary storage system reports in a completion report to the host, completion of migration of the unit of data to the migration target storage system. As a result, coordination of split data migration by a primary storage system and a secondary storage system, may be facilitated, in one embodiment.

BRIEF DESCRIPTION OF THE DRAWINGS

FIG. 7 illustrates another example of operations of a primary storage system of the computing environment of FIG. 1, employing split data migration in accordance with one aspect of the present description.

FIG. 8 illustrates an example of operations of a secondary storage system of the computing environment of FIG. 1, employing split data migration in accordance with one aspect of the present description.

DETAILED DESCRIPTION

Figure 1:
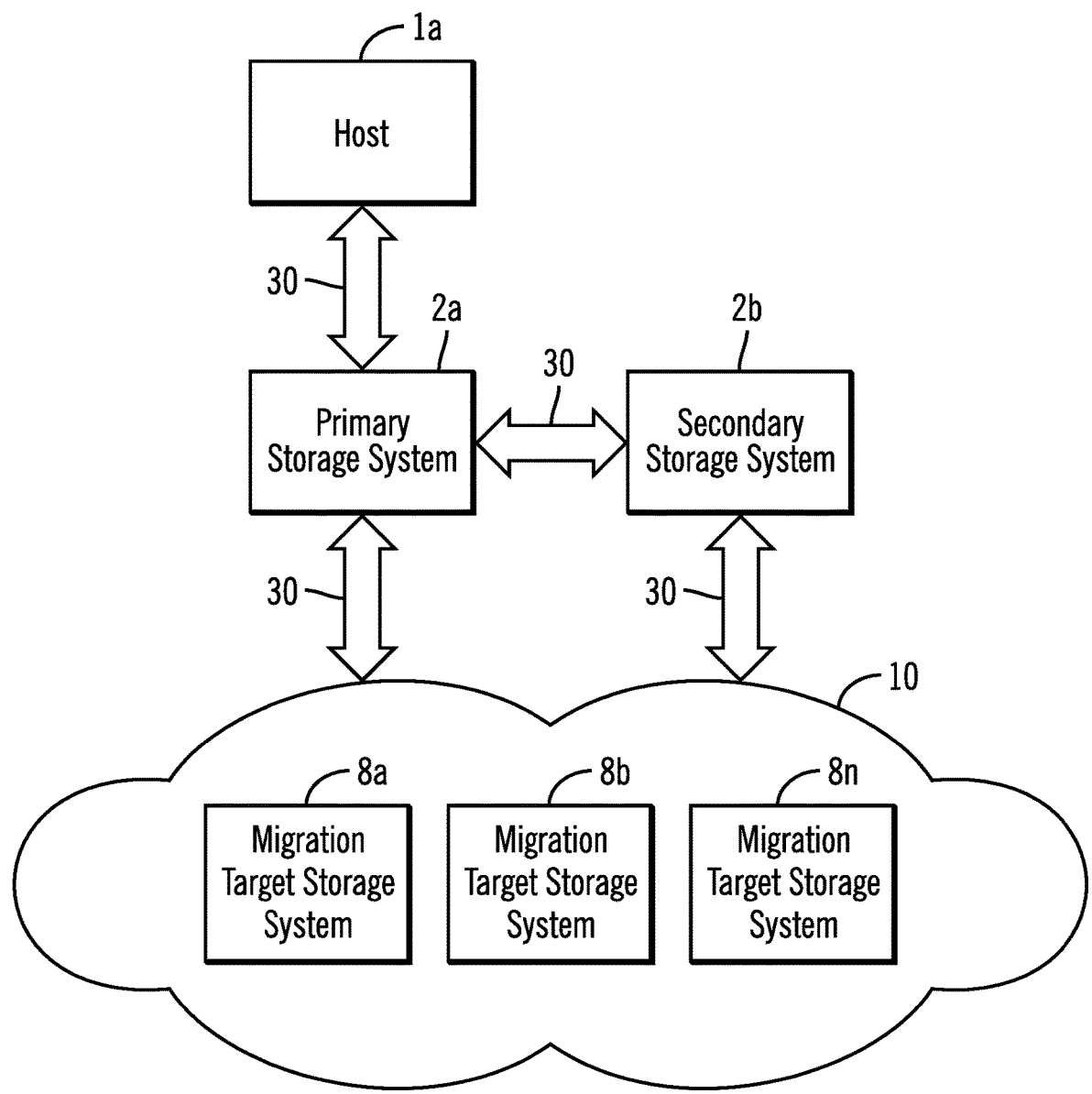
FIG. 1 illustrates an embodiment of a computing environment employing split data migration in a data storage system in accordance with one aspect of the present description.

Split data migration in accordance with the present description provides a significant improvement in computer technology. For example, in one embodiment, instead of migrating an entire volume from just the primary data storage system, a volume or other unit of data which has been previously mirrored from the primary data storage system to the secondary data storage system, is split into two or more parts. One part is migrated from the primary data storage system to a migration target storage system, and another part is migrated from the secondary data storage system, to the same, common migration target storage system.

In this manner, the migration workload of migrating a unit of data may be split between the primary and secondary storage systems, reducing the impact of migration data processing upon the primary storage system and enhancing the response time of the primary data storage system in processing other storage system tasks such as processing host initiated I/Os and mirroring other data to the secondary data storage system. In addition, split data migration in accordance with the present description can reduce the time required to migrate a unit of data since the resources of both the primary and secondary storage systems may be utilized in parallel and at the same time to migrate the unit of data in separate parallel and simultaneous migrations of data subunits of the data unit being migrated.

As a result of split data migration in accordance with the present description, the migration workload for a volume or a set of volumes is not restricted to a single data storage system but is instead split between the primary and one or more secondary data storage systems. In this manner, the migration workload on the primary data storage system is lessened, and is partially shifted to a secondary data storage system to utilize resources of the secondary data storage system to accomplish the migration of a mirrored set of volumes. Consequently, any impact of the migration workload on other workloads of the primary data storage system, such as data storage and mirroring workloads of the primary data storage system, may be significantly reduced.

In another aspect of split data migration in accordance with the present description, the split in respective migration loads of the primary and secondary data storage systems may be allocated depending upon various factors to further reduce the impact of migration workload on particular storage systems. For example, if the primary data storage system has a heavy workload of mirroring and other data storage workloads, a larger portion of the migration workload may be shifted to the secondary storage system so that the secondary storage system is performing the majority of the migration workload as compared to that of the primary storage system.

In one embodiment, the data of a data unit to be migrated may be split between the primary and secondary storage systems in such as manner as to achieve relative equality of migration bandwidth or migration data rates for each of the primary and secondary storage systems. Thus, if the busier storage systems is allocated a relatively small portion of the migration workload, and the less busy storage system is allocated a relatively larger portion of the migration workload, the resultant migration data rates from the primary and secondary data storage systems may be relatively equal. In one embodiment, the data of the data unit to be migrated may be split between the primary and secondary storage systems in a manner which facilitates the separate migration of data subunits of the primary and secondary storage systems being completed more quickly and relatively close in time.

It is seen from the above that a data storage system employing split data migration in accordance with the present description, can significantly improve efficient and economical operation of a data storage system. Other aspects and advantages may be realized, depending upon the particular application.

A system of one or more computers may be configured for split data migration in a data storage system in accordance with the present description, by virtue of having software, firmware, hardware, or a combination of them installed on the system that in operation causes or cause the system to perform split data migration in accordance with the present description. For example, one or more computer programs may be configured to perform split data migration in a data storage system by virtue of including instructions that, when executed by data processing apparatus such as for example a storage controller processor, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 2:
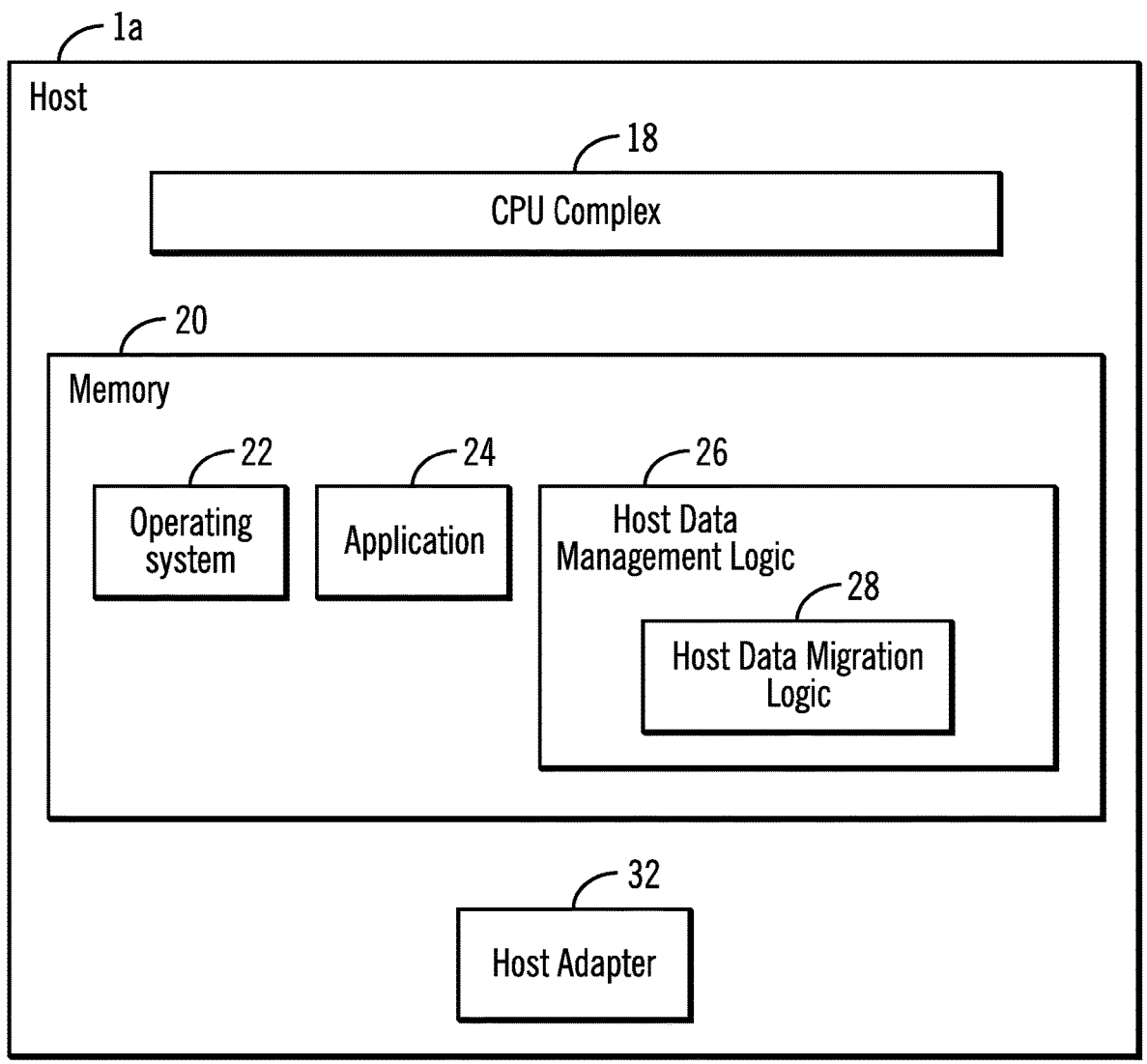
FIG. 2 illustrates an example of a host of the computing environment of FIG. 1, employing split data migration in a data storage system in accordance with one aspect of the present description.
Figure 3:
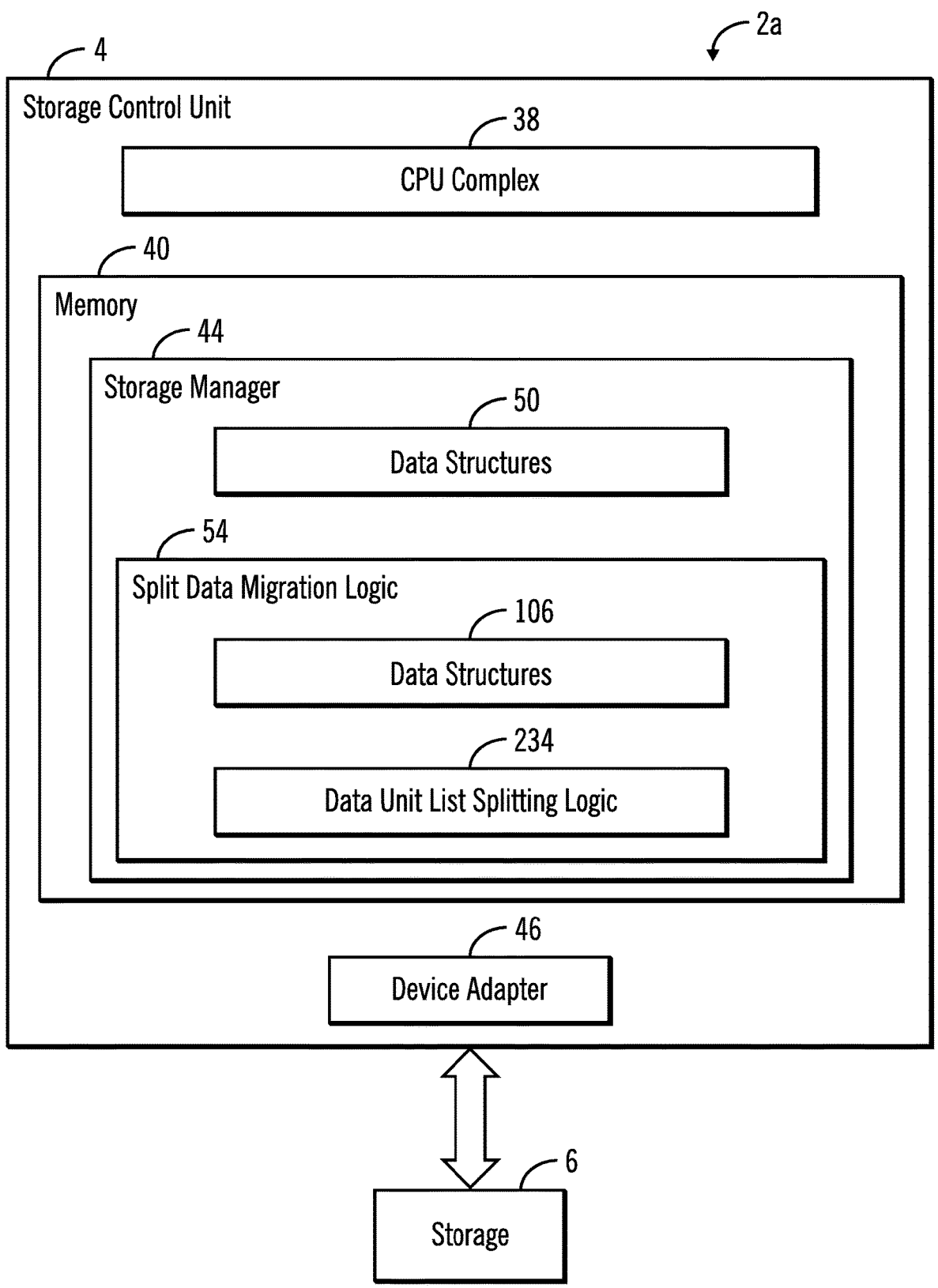
FIG. 3 illustrates an example of a storage controller of the computing environment of FIG. 1, employing split data migration in accordance with one aspect of the present description.

FIGS. 1-3 illustrate an embodiment of a computing environment employing split data migration in a data storage system in accordance with the present description. A plurality of hosts as represented by a host 1a (FIGS. 1, 2) may submit Input/Output (I/O) requests to one or more data storage devices or systems as represented by data storage systems 2a, 2b, to read or write data. Each data storage system 2a, 2b includes a storage controller or storage control unit, an example of which is shown in greater detail in FIG. 3 as storage control unit 4, which accesses user data and metadata stored in one or more storage units as represented by a storage 6 (FIG. 3).

The hosts as represented by a host 1a may be separate physical devices or may be virtual devices implemented using assigned resources of partitions of a server, for example. In a similar manner, the storage control units 4, 4a, 4b of the data storage systems 2a, 2b may be separate physical devices or may be virtual devices implemented using assigned resources of partitions one or more servers, for example.

In the illustrated embodiment, the data storage system 2a is a primary data storage system and the data storage system 2b is a secondary data storage system in which data stored on the primary data storage system 2a by a host is mirrored to the secondary data storage system 2b. Although the embodiment depicted in FIG. 1 depicts a single secondary data storage system 2b, it is appreciated that a primary data storage system 2a may have more than one secondary data storage system.

Figure 4:
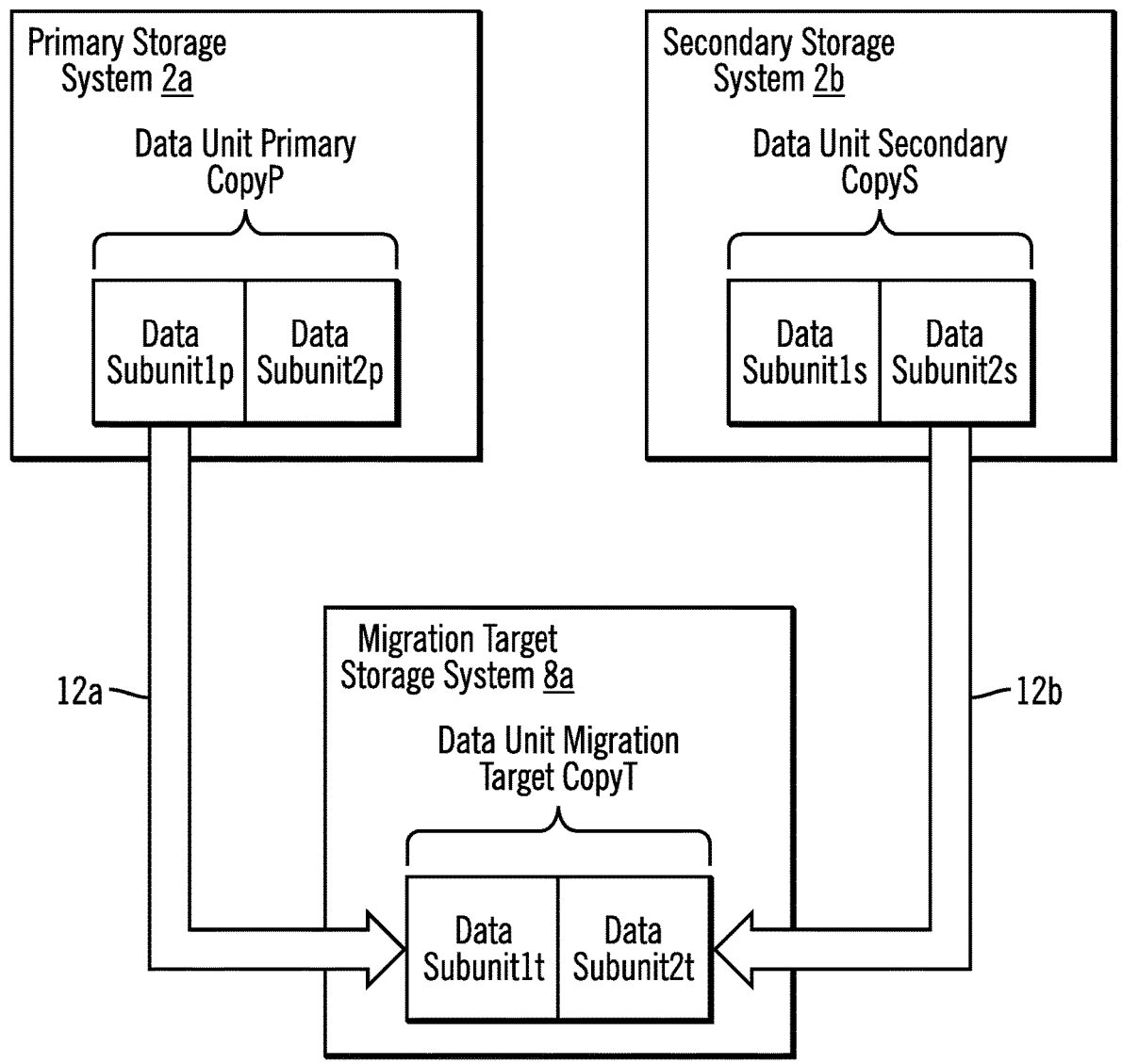
FIG. 4 illustrates an example of operations of components of a storage system of the computing environment of FIG. 1, employing split data migration in accordance with one aspect of the present description.

Data may be migrated from a data storage system 2a, 2b to a selected migration target storage system 8a, 8b . . . 8n of various storage tiers 10. In one aspect of split data migration in a data storage system in accordance with the present description, instead of migrating an entire volume from just the primary data storage system 2a, a volume which has been previously mirrored from the primary data storage system 2a to the secondary data storage system 2b, is split into at least two parts, and one part is migrated from the primary data storage system 2a to a migration target storage system 8a, for example of a tier of storage, and another part is migrated from the secondary data storage system 2b, to the same migration target storage 8a. FIG. 4 shows an example of a data unit such as one or more volumes, for example, represented as a data unit primary copyP, which has been mirrored from the primary data storage system 2a to the secondary data storage system 2b as represented by a data unit secondary CopyS.

The data unit primary copyP comprises a data set or collection of smaller units of data such as extents for example, which may be identified in a list of such extents which make up the data unit primary copyP. In this example, the data of the data unit primary copyP is "split" into two subunits, a data subunit1p and a data subunit2p. In the illustrated embodiment, the data unit primary copyP need not be physically split, but may be "split" by splitting an extent list for the data unit primary copyP into two extent sublists, an extent sublist listing the extents that make up the data subunit1p and an extent sublist listing the extents that make up the data subunit2p. In a similar manner, the data unit secondary copyS which is a mirror copy of the data unit primary copyP, may be "split" by splitting an extent list for the data unit secondary copyS into two extent sublists, an extent sublist listing the extents that make up the data subunit1s and an extent sublist listing the extents that make up the data subunit2s.

In this example, the extent sublists for the data subunit1p and data subunit1s list the same extents for the data subunit1p and data subunit1s, respectively, differing only by the physical locations of the respective extents since the extents for the data subunit1p are located on the primary data storage system 2a, and the extents for the data subunit1s are located on the secondary data storage system 2b. Thus, the data of the data subunit1p located on the primary data storage system 2a matches the data of the data subunit1s located on the secondary data storage system 2b. In a similar manner, the extent sublists for the data subunit2p and data subunit2s list the same extents for the data subunit2p and data subunit2s, respectively, differing only by the locations of the respective extents since the extents for the data subunit2p are located on the primary data storage system 2a, and the extents for the data subunit2s are located on the secondary data storage system 2b. Thus, the data of the data subunit2p located on the primary data storage system 2a matches the data of the data subunit2s located on the secondary data storage system 2b.

In one aspect of split migration in accordance with the present description, the extents of the data subunit1p of the volume or volumes of the data unit primary copyP, as identified by an extent sublist, is migrated along a migration data path 12a to a migration target storage system 8a, for example, to provide a target copy data subunit1t which is a migration copy of the data subunit1p from the primary data storage system 2a. In addition, the extents of the data subunit2s of the volume or volumes of the data unit secondary copyS, as identified by an extent sublist, are migrated along a migration data path 12b to the migration target storage system 8a to provide a target copy data subunit2t which is a migration copy of the data subunit2s from the secondary data storage system 2b. In this manner, the data unit as represented by the data unit primary copyP which has been mirrored or otherwise copied to the secondary data storage system 2b as data unit secondary copyS, is migrated in two parts, the data of data subunit1p and the data of data subunit2s, to form data unit migration target copyT having the two separately migrated subunits, data subunit1t and data subunit2t, in this example. In one embodiment, the migration target storage system 8a may be object storage. Accordingly, the data unit as represented by the data unit primary copyP which has been mirrored or otherwise copied to the secondary data storage system 2b as data unit secondary copyS, is migrated in separate objects, one object containing the data of data subunit1p and the other object containing the data of data subunit2s, to form data unit migration target copyT stored as one or more objects.

As a result of split data migration in accordance with the present description, the migration workload for a volume or a set of volumes is not restricted to a single data storage system but is instead split between both the primary and secondary data storage systems 2a, 2b, for example. In this manner, the migration workload on the primary data storage system 2a is lessened, and is partially shifted to the secondary data storage system 2b to utilize resources of the secondary data storage system 2b to accomplish the migration of the mirrored set of volumes. Consequently, any impact of the migration workload on other workloads of the primary data storage system 2a, such as data storage and mirroring workloads of the primary data storage system 2a, may be significantly reduced. In addition, the total migration time for the data unit may be reduced to that for the smaller data subunits being migrated simultaneously.

In another aspect of split data migration in accordance with the present description, the split in respective migration loads of the primary and secondary data storage systems 2a, 2b may be shifted or allocated depending upon various factors to further reduce the impact of migration workload on storage systems. For example, if the primary data storage system 2a has a heavy workload of mirroring and other data storage workloads, the burden of the migration workload may be shifted more to the secondary storage system 2b so that the secondary storage system 2b is performing the majority of the migration workload as compared to that of the primary storage system 2a. In this manner, the impact of migration workload on other workloads of the primary storage system may be further reduced, and further reducing latency of those other workloads.

A typical host as represented by the host 1a of FIG. 2 includes a CPU complex 18 and a memory 20 having an operating system 22, an application 24 and host data management logic 26, which cooperate to read data from and write data updates to the storage 6 (FIG. 3) via a storage control unit 4 (FIG. 3) of a primary data storage system 2a, for example. As described in greater detail below, in one embodiment of split data migration in accordance with the present description, host data migration logic 28 of a host such as the host 1a, is configured to initiate migration of a data unit which includes one or more full or partial volumes of data stored on a data storage system 2a, 2b to a selected migration target storage system 8a, 8b . . . 8n of the migration tiers 10. An example of a suitable operating system is the z/OS operating system. It is appreciated that other types of operating systems may be employed, depending upon the particular application.

Host initiated I/O requests may be transmitted to the primary data storage system 2a (or in some embodiments to the secondary data system 2b) over a network 30 (FIG. 1) which may include one or more data links and switches of a connection fabric to provide a connection path through the connection fabric between a selected host 1a and a selected data storage system such as a data storage system 2a, 2b. The host 1a has one or more host adapters 32 (FIG. 2) which connects a host to a data link of the network 30. The hosts and the data storage system 2a, 2b communicate in accordance with the Fibre Channel Protocol (FCP), FICON or any other suitable protocol.

Migration data may be transmitted from the primary and secondary data storage systems 2a, 2b over another portion of the network 30 coupling the primary and secondary data storage systems 2a, 2b to the migration target storage systems 8a, 8b . . . 8n of the migration tiers 10. For example, the primary and secondary data storage systems 2a, 2b may each have separate Internet Protocol (IP) ports to connect via data paths 12a (FIG. 4) and 12b, respectively, of the network 30, to the migration target storage systems 8a, 8b . . . 8n. In this example, the data paths 12a (FIG. 4) and 12b, respectively, of the network 30 may include the internet which connects to migration target storage systems 8a, 8b . . . 8n which may be cloud storage, for example.

Thus, the system components 1a (FIG. 1), 2a, 2b and 8a, 8b, . . . 8n are connected to the network 30 which enables communication among these components. As noted above, the network includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to a host 1a may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

The host 1a, storage control unit 4 of a data storage system 2a, 2b and a migration target storage system 8a, 8b, . . . 8n, may each comprise any suitable computational device including those presently known in the art, such as, a personal computer, a workstation, a server, a mainframe, a hand held computer, a palm top computer, a telephony device, a network appliance, a blade computer, a processing device, etc. The host 1a, storage control unit 4 of a data storage system 2a, 2b and a migration target storage system 8a, 8b . . . 8n, may be elements in any suitable network, such as, a storage area network, a wide area network, the Internet, an intranet. In certain embodiments, one or more of a host 1a, storage control unit 4 of a data storage system 2a, 2b and a migration target storage system 8a, 8b . . . 8n, may be elements in a cloud computing environment.

It is appreciated that one or more data storage units of the storage 6 (FIG. 3), 8a, 8b . . . 8n may comprise any suitable device capable of storing data in a nonvolatile manner, such as hard drives, solid state drives, tape drives, etc., known in the art. Thus, in one embodiment, the storage 6 (FIG. 3), 8a, 8b . . . 8n may be comprised of one or more sequential access storage devices, such as hard disk drives and magnetic tape drives or may also include non-sequential access storage devices such as solid state drives (SSD), for example. Such additional devices of storage 6 (FIG. 3), 8a, 8b . . . 8n may comprise a single sequential or non-sequential access device for data storage or may comprise an array of devices for data storage, such as a Just a Bunch of Disks (JBOD), Direct Access Storage Device (DASD), Redundant Array of Independent Disks (RAID) array, virtualization device, tape storage, flash memory, etc.

In certain embodiments additional storage units may be disks, for example, that are configured as a Redundant Array of Independent Disk (RAID) storage arrays in which one or more RAID storage array is an array of hard disks in a RAID configuration to facilitate data recovery in the event of loss of a hard disk. RAID storage units of the storage 6 (FIG. 3), 8a, 8b . . . 8n may also be other types of storage such as solid state drives in a RAID configuration to facilitate data recovery in the event of loss of a solid state drive. The storage units of the storage 6 (FIG. 3), 8a, 8b . . . 8n may be configured to store data in subunits of data storage such as volumes, tracks, extents, etc.

Each storage control unit 4 (FIG. 3), of the illustrated embodiment, includes a CPU complex 38 (FIG. 3) having processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage control unit 4 (FIG. 3), further has a memory 40 that includes a storage manager 44 configured to manage storage operations including writing data to or reading data from a storage unit of an associated storage 6 in response to an I/O data or mirror request from a host or another data storage system. Each storage control unit 4 (FIG. 3), has one or more device adapters 46 (FIG. 3) which connects a storage control unit to a data link (FIG. 1) of the network 30. The storage manager 44 includes appropriate storage device drivers to configure associated storage 6.

The CPU complex 38 of each storage control unit 4 (FIG. 3) may have multiple clusters of processors, each cluster having its own assigned memory 40, storage manager 44, cache, etc. The processing and memory resources assigned each cluster may be physical, virtual, shared, transferrable or dedicated, depending upon the particular application.

In the illustrated embodiment, the storage manager 44 includes mirror logic that is configured to execute in the storage control unit 4 of the primary storage system 2a (FIG. 1) and perform copy operations to copy extents, tracks or other portions of storage volumes from the primary storage system 2a, to the secondary storage system 2b, in a consistent manner. For example, a primary-secondary pair of volumes, may be in a synchronous copy or mirror relationship such that updates to the primary volume are synchronously mirrored to each secondary volume.

In the illustrated embodiment, a copy relationship is represented by a data structure 50 of the memory 40 of FIG. 3. Thus, one or more copy relationships, which may be maintained by the mirror logic for the storage control units 4 of the primary and secondary storage systems 2a, 2b (FIG. 1) associate primary storage locations in the primary storage system 2a and corresponding secondary storage locations in secondary storage systems as represented by the secondary storage system 2b of the mirror relationship, such that updates to storage locations of primary storage system 2a are mirrored, that is, copied to the corresponding locations of the secondary storage system 2b. For example, source storage locations in a primary storage volume (FIG. 1) of primary storage system 2a may be asynchronously mirrored in a mirror operation to target storage locations of a secondary volume of the secondary storage system 2b pursuant to a mirror copy relationship. Similarly, source storage locations in the primary storage volume (FIG. 1) of primary storage system 2a may be synchronously mirrored in a mirror operation to additional target storage locations of another secondary volume of another secondary storage system 2b pursuant to a mirror copy relationship.

In the illustrated embodiment, a copy relationship comprises a synchronous mirror relationship for a pair of storage locations in which updates to the primary (source) storage locations of the mirror relationship are synchronously mirrored to the secondary (target) storage locations of the mirror relationship. It is appreciated that other types of copy relationships such as asynchronous, for example, may be established, depending upon the particular application.

The primary storage system 2a is located at a first site and the secondary storage system 2b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 30.

Figure 5:
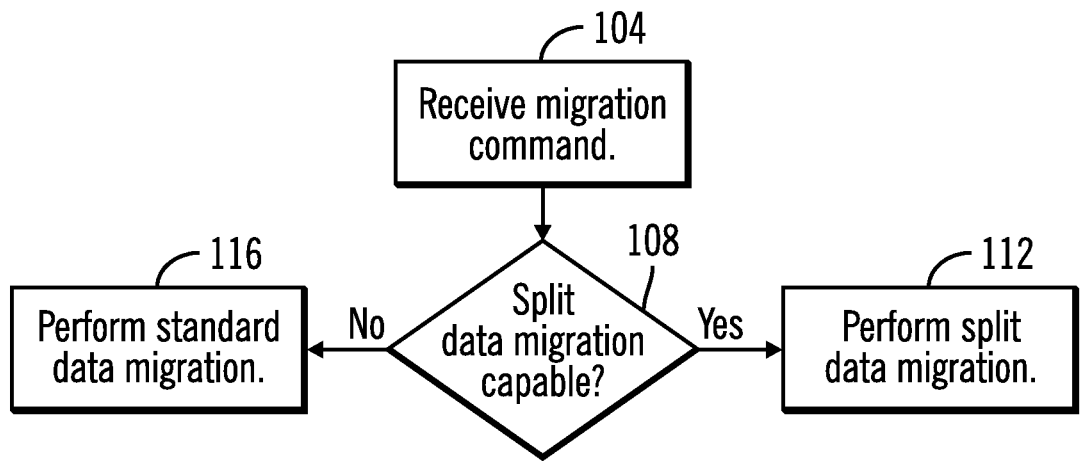
FIG. 5 illustrates another example of operations of components of a storage system of the computing environment of FIG. 1, employing split data migration in accordance with one aspect of the present description.

FIG. 5 depicts one example of automated operations of split data migration logic 54 (FIG. 3) of one or more of the storage control units 4 of the primary and secondary storage systems 2a, 2b. In this example, the split data migration logic 54 of the primary storage system 2a is configured to receive (block 104, FIG. 5) a migration command which is issued to the primary storage system 2a by host data migration logic 28 (FIG. 2) of a host such as the host 1a. The migration command from the host data migration logic 28 initiates migration of a unit of data to a migration target storage system such as the migration target storage system 8a (FIG. 1), for example. Although migration is described herein in connection with migration of a data unit, it is appreciated that split data migration in accordance with the present description is applicable to migration of multiple units of data, depending upon the particular application.

In the illustrated embodiment, the host data migration logic 28 (FIG. 2) of a host and the split data migration logic 54 (FIG. 4) of a storage control unit include components of a migration system such as the DS8000 Transparent Cloud Tiering marketed by International Business Machines Corporation, which permit data to be migrated in a direct movement from a storage system to another storage tier such as an object storage system, for example, without the need for a host to first read the data being migrated. The components of the migration system are modified as appropriate to perform split data migration in accordance with the present description.

In this example, the migration command received (block 104, FIG. 5) from the host data migration logic 28 (FIG. 2) of a host, identifies the data unit (or units) to be migrated and the migration target storage system to which the identified data unit is to be migrated. However, it is appreciated that in some embodiments, a migration command to initiate migration may omit one or more of these parameters. For example, the identity of a data unit or units to be migrated in response to a migration command may be cached in a data structure 106 (FIG. 3) of the split data migration logic 54. Similarly, the identity of a migration target storage system for data unit or units to be migrated in response to a migration command may be cached in a data structure 106 (FIG. 3) of the split data migration logic 54. Other techniques for identifying data units to be migrated and the associated migration target storage systems may be utilized, depending upon the particular application.

The split data migration logic 54 of the receiving primary storage system 2a, is configured to, in response to receipt of the migration command, determine (block 108, FIG. 5) whether the primary and secondary data storage systems 2a, 2b are capable of performing split data migration for the identified data unit to the identified migration target storage system as described in greater detail below in connection with FIG. 6. If so, split data migration in accordance with the present description is performed (block 112, FIG. 5) to migrate the identified data unit to the identified migration target storage system as described in greater detail below in connection with FIGS. 7-9. Conversely, if it is determined (block 108, FIG. 5) that the primary and secondary data storage systems 2a, 2b are not capable of performing split data migration for the identified data unit to the identified migration target storage system, the identified data unit may be migrated (block 116, FIG. 5) to the identified migration target storage system using known data migration techniques, for example.

Figure 6:
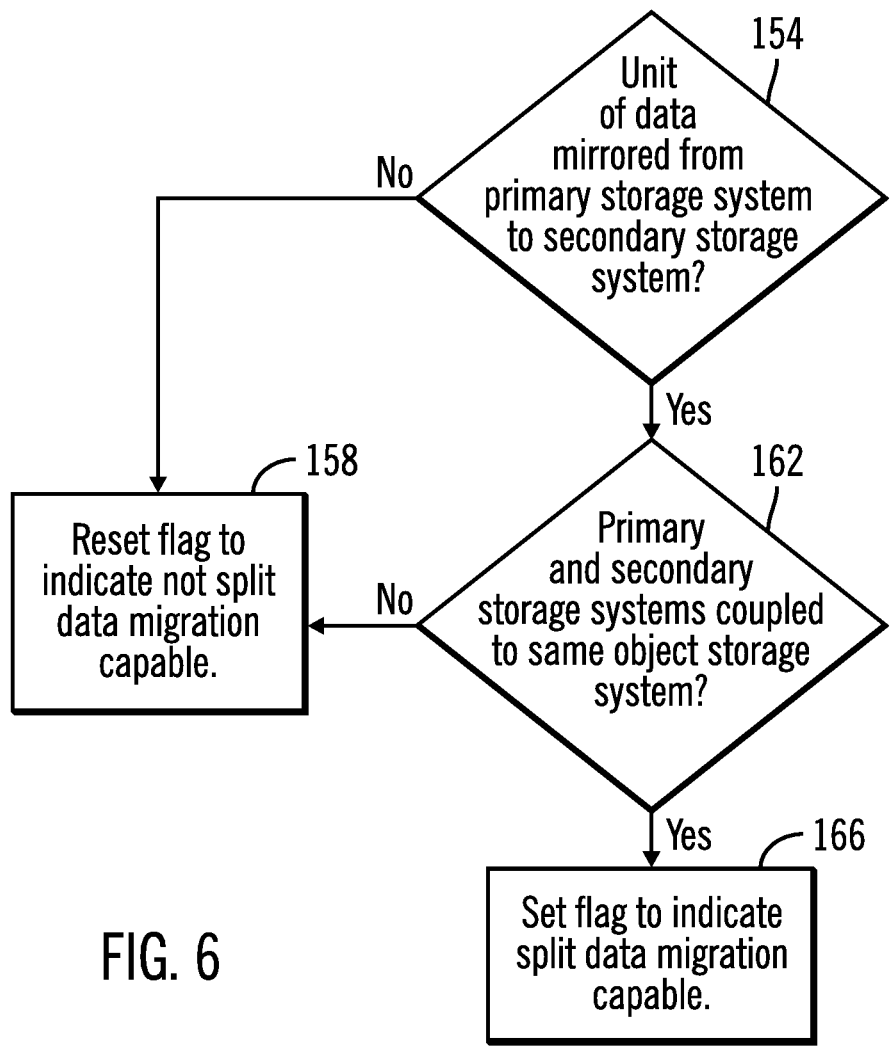
FIG. 6 illustrates an example of operations of a primary storage system of the computing environment of FIG. 1, employing split data migration in accordance with one aspect of the present description.

FIG. 6 depicts one example of automated operations of split data migration logic 54 (FIG. 3) of one or more of the storage control units 4 of the primary and secondary storage systems 2a, 2b, in determining (block 108, FIG. 5) whether the primary and secondary data storage systems 2a, 2b are capable of performing split data migration for the data unit identified by the migration command, to the migration target storage system identified by the migration command. In this example, the split data migration logic 54 of the primary storage system 2a is configured to determine (block 154, FIG. 6) whether the identified unit of data to be migrated has been mirrored from the primary storage system to a secondary storage system so that there is a primary copy of the unit of data stored at the primary storage system and a secondary copy of the unit of data stored at the secondary storage system. In this example, the determination of split data migration capability includes determining whether the mirroring has been completed such that the mirror copy on the secondary data storage system 2b contains all the data of the primary copy on the primary storage system. In addition, in one embodiment, the determination of split data migration capability may include determining whether the primary and secondary copies are offline with respect to the host such that the host is prevented from updating or changing the data of the data unit before migration is completed. If it is determined that the storage systems are not split data migration capable for the selected data unit, results of the capability determination may stored in the form of a split data migration capable flag which may be reset (block 158, FIG. 6) and cached in the data structures 106 (FIG. 3) of the split data migration logic 54 of the storage control unit 4 of the primary data storage system 2a, to indicate that the primary and secondary data storage systems 2a, 2b are not capable of performing split data migration for the data unit identified by the migration command, in this example.

Conversely, if it is determined (block 154, FIG. 6) that the identified unit of data to be migrated has been successfully mirrored from the primary storage system to a secondary storage system so that there is a primary copy of the unit of data stored at the primary storage system and a secondary or mirror copy of the unit of data stored at the secondary storage system, the split data migration logic 54 of the primary storage system 2a is further configured to determine (block 162, FIG. 6) whether the primary and secondary storage systems are each coupled to the same migration target storage system, that is, the migration target storage system identified by the received migration command in this example. If so, a split migration capable flag representing the results of the capability determination, may be set (block 166, FIG. 6) and cached in the data structures 106 (FIG. 3) of the split data migration logic 54 of the storage control unit 4 of the primary data storage system 2a, to indicate that the primary and secondary data storage systems 2a, 2b are capable of performing split data migration for the data unit and the migration target storage system identified by the migration command, in this example. Conversely, if it is determined (block 162, FIG. 6) that the primary and secondary storage systems are not each coupled to the migration target storage system identified by the received migration command in this example, a split data migration capable flag may be reset (block 158, FIG. 6) and cached in the data structures 106 (FIG. 3) of the split data migration logic 54 of the storage control unit 4 of the primary data storage system 2a, to indicate that the primary and secondary data storage systems 2a, 2b are not capable of performing split data migration for the migration target storage system identified by the migration command, in this example.

Having performed the operations of FIG. 6 for a particular data unit and migration target storage system identified in connection with a migration command, the split data migration logic 54 of the primary storage system 2a can determine (block 108, FIG. 5) whether the primary and secondary data storage systems 2a, 2b are capable of performing split data migration for the identified data unit to the identified migration target storage system in response to further migration commands, by inspecting the split migration capable flag which has been set or reset as appropriate as discussed above in connection with FIG. 6 for the identified data unit and migration target storage system associated with a migration command. In this manner, a determination of whether the storage system has the capability to perform split data migration may be made as a function of cached determination results. Alternatively, the split migration capability may be freshly determined in the manner described in connection with FIG. 6 in response to each further migration command. It is appreciated that other techniques may be utilized, depending upon the particular application.

Figure 9:
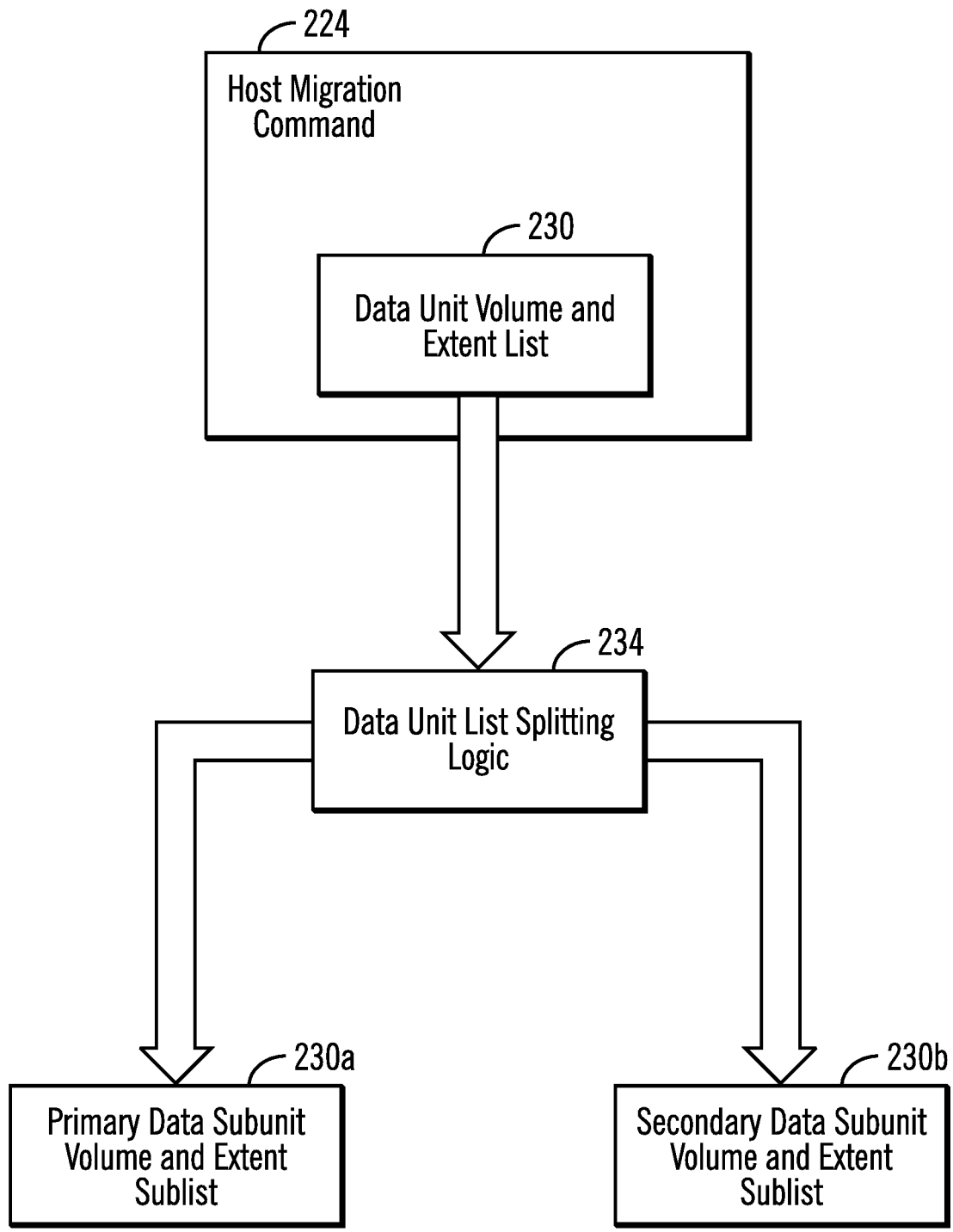
FIG. 9 illustrates another example of operations of components of the computing environment of FIG. 1, employing split data migration in accordance with one aspect of the present description.

FIGS. 7-9 depict one example of automated operations of split data migration logic 54 (FIG. 3) of the storage control units 4 of the primary and secondary storage systems 2a, 2b, in performing (block 112, FIG. 5) split data migration in accordance with the present description. In this example, the split data migration logic 54 (FIG. 3) of the storage control unit 4 of the primary storage system 2a is configured to split (block 204, FIG. 7) the primary copy of the data unit to be migrated such as the data unit primary copyP (FIG. 4), into first and second primary data subunits such as the data subunit1p and the data subunit2p as shown in FIG. 4. In addition, the split data migration logic 54 (FIG. 3) of the storage control unit 4 of the primary storage system 2a is configured to send (block 208, FIG. 7) a separate object migration command to the secondary data storage system 2b.

In the illustrated embodiment, the separate object migration command may be sent to the secondary data storage system 2b by the split data migration logic 54 (FIG. 3) of the storage control unit 4 of the primary storage system 2a "in band", that is, directly to the secondary storage system 2b and bypassing the requesting host. It is appreciated that commands and responses may be transmitted between data storage systems using other techniques, depending upon the particular application.

Upon receipt (block 212, FIG. 8) of the separate object migration command from the primary storage system 2a, the split data migration logic 54 (FIG. 3) of the storage control unit 4 of the secondary storage system 2a is configured to split (block 216, FIG. 8) the secondary copy of the data unit to be migrated such as the data unit secondary copyS (FIG. 4), into first and second secondary data subunits such as the data subunit1s and the data subunit2s as shown in FIG. 4.

FIG. 9 depicts one example of automatic operations for splitting a data unit to be migrated for split data migration in accordance with the present description. In this example, a migration command such as the migration command 224 received by the storage control unit 4 of the primary storage system 2a, includes a data unit volume and extent list 230 which identifies extents of one or more volumes to be migrated to a particular migration target storage system such the migration target storage system 8a (FIG. 4). These extents of the data unit volume and extent list 230 to be migrated are referred to collectively as the data unit primary copyP (FIG. 4) which has been mirrored to the secondary data storage system 2b as data unit secondary copyS in FIG. 4.

The split data migration logic 54 (FIG. 3) of the storage control unit 4 of the primary storage system 2a includes data unit list splitting logic 234 (FIGS. 3, 9) which is configured to split the data unit volume and extent list 230 from the host into two sublists, primary data subunit volume and extent sublist 230a (FIG. 9) and secondary data subunit volume and extent sublist 230b. The data unit volume and extent list 230a identifies extents of one or more volumes of the data unit primary copyP (FIG. 4) to be migrated from the primary storage system 2a to the migration target storage system 8a (FIG. 4). These extents of the data unit volume and extent list 230a to be migrated are located on the primary storage system 2a and are referred to collectively as the data unit primary subunit1p (FIG. 4), the data of which is to be migrated from the primary storage system 2a to the migration target storage system 8a (FIG. 4).

In a similar manner, data unit volume and extent list 230b (FIG. 9) identifies extents of one or more volumes of the data unit secondary copyS (FIG. 4) to be migrated from the secondary storage system 2b to the migration target storage system 8a (FIG. 4). These extents of the data unit volume and extent list 230b to be migrated are located on the secondary storage system 2b and are referred to collectively as the data unit primary subunit2s (FIG. 4), the data of which is to be migrated from the secondary storage system 2b to the migration target storage system 8a (FIG. 4).

Thus, the data of the data unit primary copyP (FIG. 4) to be migrated to the migration target storage system 8a (FIG.

4) is split into two data subunits, data subunit1*p* located on the primary data storage system 2*a*, and the data subunit2*s* located on the secondary data storage system 2*b*. As a result, the data of the data subunit1*p* and the data of the data subunit 2*s* collectively are the same as the data of the data unit primary copyP. In this embodiment, the data unit to be migrated is split into two data subunits, one subunit located on a primary data storage system and the other subunit located on a secondary data storage system. It is appreciated that a copy or mirror relationship may have more than one secondary data storage system. Accordingly, it is appreciated that split data migration in accordance with the present description may be applied to multiple secondary data storage systems such that a data unit to be migrated may be split into more than two data subunits. Each subunit may be migrated separately from the storage system on which it is located to a common migration target storage system.

In one embodiment, the data unit list splitting logic 234 (FIG. 3) which splits a data unit volume and extent list identifying data to be migrated into separate data subunit volume and extent sublists for separate migration of data, may be located on a single storage system such as the primary storage system 2*a*, for example. In such embodiments, a data unit list splitting logic 234 (FIG. 3) of the primary storage system 2*a* may generate separate data subunit volume and extent sublists 230*a*, 230*b* for the primary and secondary data storage systems 2*a*, 2*b*, respectively, for separate migration of the data of the separate sublists. The data subunit volume and extent sublist generated for each particular secondary data storage system may be communicated by the primary storage system 2*a* to each particular secondary data storage system such as in association with a separate object migration command (block 208, FIG. 7) sent to the particular secondary storage system to initiate split data migration on that secondary storage system.

In another embodiment, the data unit list splitting logic 234 (FIG. 3) which splits a data unit volume and extent list identifying data to be migrated into separate data subunit volume and extent sublists for separate migration of data, may be distributed over multiple storage systems such as the primary storage system 2*a* and secondary storage system 2*b*, for example. In such embodiments, a data unit list splitting logic 234 (FIG. 3) of the primary storage system 2*a*, for example, may identify the manner in which a data unit to be migrated is to be split, such as providing information identifying one or more split points, for example, to enable each of the other storage systems to generate separate data subunit volume and extent sublists for separate migration of the data of the separate sublists. The information identifying the manner in which a data unit to be migrated is to be split for generating a data subunit volume and extent sublist for a particular secondary data storage system may be communicated by the primary storage system 2*a* to the particular secondary data storage system such as in association with a separate object migration command (block 208, FIG. 7) sent to the secondary storage system to initiate split data migration on that secondary storage system.

In one embodiment, each extent of the extents of the separate data subunit volume and extent sublist 230*a* for the primary data storage system 2*a* is a set of contiguous tracks and the sets of tracks are ordered in ascending (or descending) track address order to enhance efficiency of the migration process. Similarly, the extents of separate data subunit volume and extent sublist 230*b* for the secondary storage system 2*b* are grouped in sets of contiguous tracks and the sets of tracks are ordered in ascending (or descending) address order.

As used herein in one embodiment, a track is a subunit of an extent which in turn is a subunit of a volume. Thus, the terms track, extent and volume refer to various types of subunits of data or storage of a disk storage unit, a solid state storage unit or other types of storage units. In addition to tracks, extents or volumes, storage units may have other subunits of storage or data such as a bit, byte, word, segment, page, block (such as a Logical Block Address (LBA)), cylinder, segment, logical device, etc. or any portion thereof, or other subunits suitable for transfer, migration or storage. Accordingly, the size of subunits of data processed in migration operations in accordance with the present description may vary, depending upon the particular application. Thus, as used herein, the term "track" or the term "extent" or the term "volume" refers to any suitable unit or subunit of data storage, migration or transfer.

Upon completion of the splitting of the data of the data unit primary copyP (FIG. 4) to be migrated and formation of the primary data subunit volume and extent sublist 230*a* (FIG. 9), the split data migration logic 54 (FIG. 4) of the primary storage systems 2*a* is configured to migrate (block 240, FIG. 7) the data of the data subunit1*p* as identified by the primary data subunit volume and extent sublist 230*a* (FIG. 9), to the migration target storage system 8*a*. In one embodiment, the data of the data subunit1*p* (FIG. 4) is migrated asynchronously using resources of the primary storage system 2*a* such as DS8000 Transparent Cloud Tiering, for example in a direct movement from an offline volume or volumes stored on the primary storage system 2*a* to the migration storage system 8*a* without the need for a host to first read the data. In the illustrated embodiment, the migration target storage system 8*a* is object storage such that the data of the data subunit1*p* (FIG. 4) is migrated in object form from an Internet Protocol (IP) port of the primary storage system 2*a* to the migration storage system 8*a*. It is appreciated that the subunit data may be migrated using other techniques, including synchronous techniques, depending upon the particular application. Upon completion of the migration of the data of the data subunit1*p* to the migration target storage system 8*a*, the migration target storage system 8*a* will contain a copy of the data of the data subunit1*p* in the form of a data subunit1*t*. As noted above, in this example, the migration target storage system 8*a* is an object storage. As such, the data of the data subunit1*p* may be migrated and stored as one or more objects as represented by the data subunit1*t*.

Similarly, upon completion of the splitting of the data of the data unit primary copyP (FIG. 4) to be migrated and formation of the secondary data subunit volume and extent sublist 230*b* (FIG. 9), the split data migration logic 54 (FIG. 4) of the secondary storage systems 2*b* is configured to migrate (block 244, FIG. 8) the data of the data subunit2*s* as identified by the secondary data subunit volume and extent sublist 230*b* (FIG. 9), to the common migration target storage system 8*a*. In one embodiment, the data of the data subunit2*s* may be migrated simultaneously and in parallel with the data of the data subunit1*p*, to the common migration target storage system 8*a*. It is appreciated that the relative timing of the respective migrations of the data of the data subunit2*s* and the data the data subunit1*p* may vary, depending upon the particular application. Thus, the migrations of the data of the data subunit2*s* and the data the data subunit1*p* may overlap in time to a greater or lesser degree, or be performed at different times altogether.

In one embodiment, the data of the data subunit2*s* like the data of the data subunit1*p*, is migrated using resources of the secondary storage system 2*b* such as DS8000 Transparent Cloud Tiering, for example in a direct asynchronous movement from an off volume or volumes of data stored on the secondary storage system 2*b* to the migration storage system 8*a* without the need for a host to first read the data. As noted above, in the illustrated embodiment, the migration target storage system 8*a* is object storage such that the data of the data subunit2*s* (FIG. 4) is migrated in object form from an IP port of the secondary storage system 2*b* to the migration storage system 8*a*. It is appreciated that the subunit data may be migrated using other techniques, including synchronous techniques, depending upon the particular application. Upon completion of the migration of the data of the data subunit2*s* to the migration target storage system 8*a*, the migration target storage system 8*a* will contain a copy of the data of the data subunit2*s* in the form of a data subunit2*t*. In this example, data of the data subunit2*s* is migrated and stored as one or more objects as represented by the data subunit2*t*.

In this manner, the migration workload of migrating a unit of data such as the data unit primary copyP (FIG. 4), may be split between the primary and secondary storage systems 2*a*, 2*b*, reducing the impact of migration data processing upon the primary storage system 2*a* and enhancing the response time of the primary data storage system 2*a* in processing host initiated I/Os and mirroring of data to the secondary data storage system 2*b*. In addition, split data migration in accordance with the present description can reduce the time required to migrate a unit of data since the resources of both the primary and secondary storage systems may be utilized in parallel and at the same time to migrate the unit of data in separate parallel and simultaneous migrations of data subunits of the data unit being migrated.

In one aspect of split data migration in accordance with the present description, it is appreciated that a data unit to be migrated need not be split into subunits of equal size on the different storage systems. Instead, a data unit to be migrated may be split into subunits of unequal size depending upon various factors. For example, the relative sizes of the data subunits may be determined as a function of the utilization rate of one or more of the data storage systems in performing other data processing tasks including host initiated I/O operations and data mirroring, for example.

In one embodiment, the split data migration logic 54 (FIG. 9) may be configured to split the data unit to be migrated into first and second subunits as a function of utilization rate of the primary storage system 2*a* or a rank of storage devices of the primary storage system 2*a* which are storing the data of the data unit such as data unit primary copyP (FIG. 4) for example, to be migrated. Thus, if the rank of storage devices of the primary storage system 2*a* storing the data of the data unit primary copyP has a relatively high utilization rate in performing I/O, mirror and other tasks, the subunit such as data subunit 2*s* for example, located on the secondary storage system 2*b* may be sized relatively larger than that of the data subunit1*p* located on the primary storage system 2*a*. As a result, the majority of the migration workload for migrating the data of the data unit be migrated may be undertaken by the secondary storage system 2*b*, relieving the primary storage system 2*a* of the majority of the migration workload.

The utilization rate of a storage system may be determined using suitable techniques including those currently known or which will be developed. In one embodiment, the utilization rate of the primary storage system 2*a* may be compared to a standard, and if the utilization rate of the primary storage system is high relative to the standard, indicating that the primary storage system is relatively busy performing other data processing tasks, the primary and secondary copies of the unit of data to be migrated, can each be split into first and second subunits in which the size of the second subunit of data is larger than that of the size of the first subunit of data. Conversely, if the utilization rate of the primary storage system is low relative to the standard, indicating that the primary storage system has substantial amounts of unused processing capacity, for example, the size of the second subunit of data relative to the first subunit of data may be made substantially equal, in one example.

In one embodiment, the data of the data unit to be migrated may be split between the primary and secondary storage systems in such a manner as to achieve relative equality of migration bandwidth for each of the primary and secondary storage systems. Thus, if the busier storage systems is allocated a relatively small portion of the migration workload, and the less busy storage system is allocated a relatively larger portion of the migration workload, the resultant migration data rates from the primary and secondary data storage systems may be relatively equal. In one embodiment, the data unit to be migrated may be split between the primary and secondary storage systems in a manner which facilitate the separate migrations of the data subunits of the primary and secondary storage systems being completed relatively close in time, particularly if the utilization rate of the primary storage system is low relative to the standard, indicating that the primary storage system has substantial amounts of unused processing capacity.

The split data migration logic 54 (FIG. 4) of the secondary storage systems 2*b* is configured to determine (block 264, FIG. 8) whether the migration (block 244, FIG. 8) of the data of the data subunit2*s* as identified by the secondary data subunit volume and extent sublist 230*b* (FIG. 9), to the common migration target storage system 8*a*, has been completed. If so, a completion report is sent (block 268, FIG. 8) to the primary storage system 2*a* indicating that the requested separate object migration by the received command (block 212, FIG. 8) has been completed. In one embodiment, the separate object command from the primary storage system 2*a* may have a bit set to indicate that the separate object command is from the primary storage systems 2*a* such that the separate object command completion report may be reported to the issuing primary storage system 2*a* instead of to a host.

In a similar manner, the split data migration logic 54 (FIG. 4) of the primary storage system 2*a* is configured to determine (block 274, FIG. 7) whether the migration (block 240, FIG. 7) of the data of the data subunit1*p* as identified by the primary data subunit volume and extent sublist 230*a* (FIG. 9), to the common migration target storage system 8*a*, has been completed. If so, the split data migration logic 54 (FIG. 4) of the primary storage system 2*a* also determines (block 278, FIG. 7) whether a completion report has been received from the secondary storage system 2*b* indicating that the separate object migration requested by the sent separate object migration command (block 208, FIG. 7) has been completed. If so, the split data migration logic 54 (FIG. 4) of the primary storage system 2*a* reports (block 282, FIG. 7) in a completion report to the requesting host, completion of migration of the entire unit of data to the migration target storage system. In this manner, coordination of split data migration by a primary storage system and a secondary storage system, may be facilitated, in one embodiment.

In the illustrated embodiment, the storage manager 44 is depicted as software stored in the memory 40 and executed by the CPU complex 38. However, it is appreciated that the logic functions of the storage manager 44 may be implemented as hardware, software, firmware or combinations of one or more thereof, depending upon the particular application.

Figure 10:
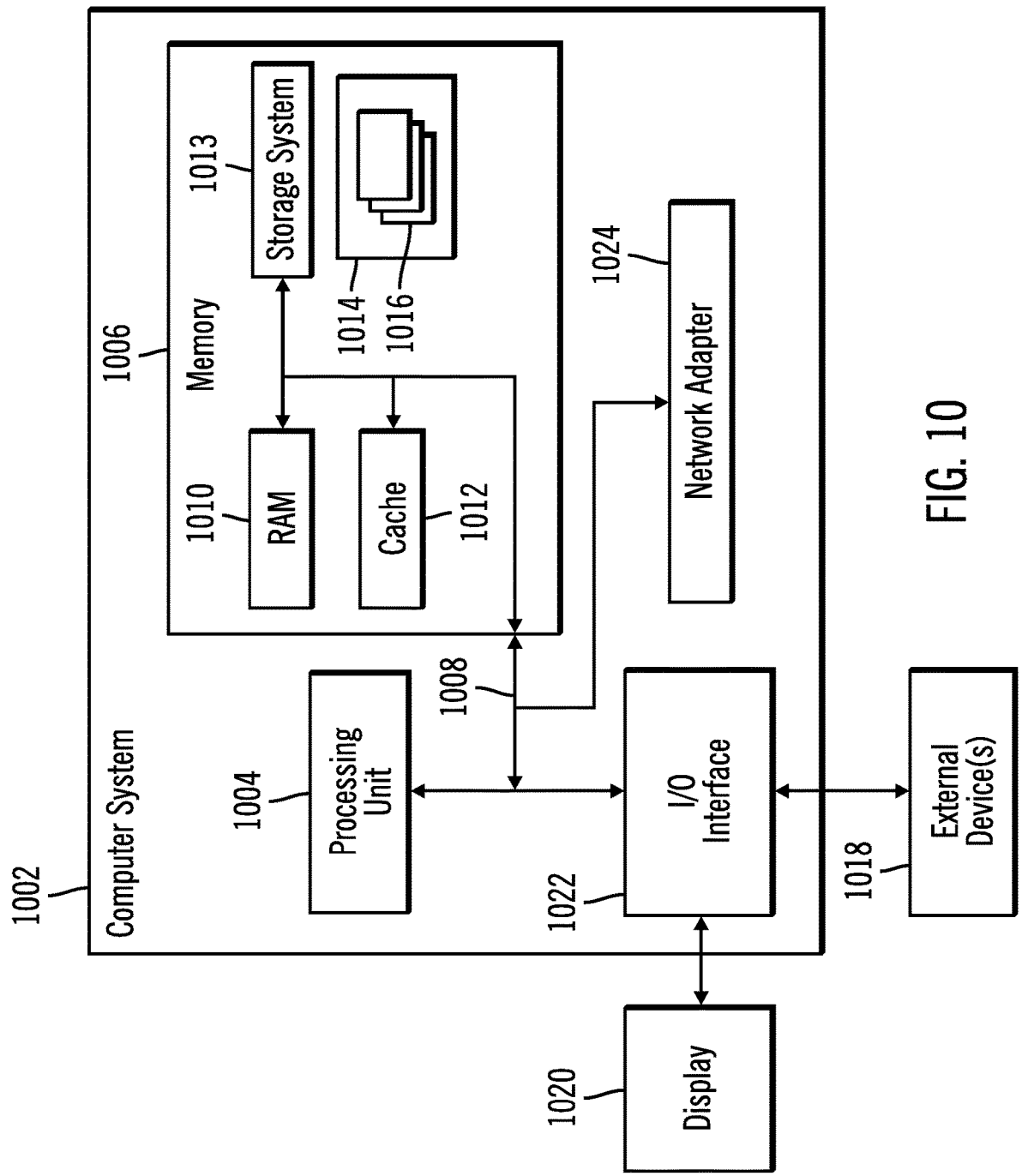
FIG. 10 illustrates a computer embodiment employing split data migration in a data storage system in accordance with the present description.

The computational components of the figures may each be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product configured for use with a computer system having a host, a migration target storage system, a primary storage system and a secondary storage system, each storage system having a storage controller and at least one storage unit controlled by the storage controller and configured to store data, wherein the computer system has at least one processor, and wherein the computer program product comprises a computer readable storage medium having program instructions embodied therewith, the program instructions executable by a processor of the computer system to cause computer system operations, the computer system operations comprising:

copying data of a unit of data from primary storage system to secondary storage system to form a primary copy of the unit of data stored at the primary storage system and a secondary copy of the unit of data stored at the secondary storage system; and performing split data migration including:

splitting the primary copy of the unit of data stored at the primary storage system into subunits of data including first and second subunits of the primary copy of the unit of data stored at the primary storage system;

splitting the secondary copy of the unit of data stored at the secondary storage system into subunits of data including first and second subunits of the secondary copy of the unit of data stored at the secondary storage system data;

migrating data of the first subunit of the primary copy of the unit of data from the primary storage system as a first object to a migration target storage system; and migrating data of the second subunit of the secondary copy of the unit of data from the secondary storage system as a second object to the migration target storage system so that all of the data of the unit of data is migrated to the migration target storage system as separate objects including the first object containing data of the first subunit of the primary copy of the unit of data migrated from the primary storage system and the second object containing data of the second subunit of the secondary copy of the unit data migrated from the secondary system.

2. The computer program product of claim 1 wherein the splitting of the primary and secondary copies of the unit of data into the first and second subunits is a function of utilization rate of the primary storage system.

3. The computer program product of claim 2 further comprising comparing the utilization rate of the primary storage system to a standard and wherein the splitting of the primary and secondary copies of the unit of data into the first and second subunits increases the size of the second subunit of data relative to the first subunit of data if the utilization rate of the primary storage system is high relative to the standard.

4. The computer program product of claim 2 further comprising comparing the utilization rate of the primary storage system to a standard and wherein the splitting of the primary and secondary copies of the unit of data into the first and second subunits of data maintains a migration rate of the second object relative to the first object as substantially equal if the utilization rate of the primary storage system is low relative to the standard.

5. The computer program product of claim 1 further comprising:

receiving a migration command from a host to migrate the unit of data to the migration target storage system; and in response to the migration command, determining whether a storage system which includes the primary and secondary storage systems has a capability to perform split data migration including:

determining whether the unit of data has been mirrored from the primary storage system to the secondary storage system to form the primary copy of the unit of data stored at the primary storage system and the secondary copy of the unit of data stored at the secondary storage system; and determining whether the primary and secondary storage systems are each coupled to the same migration target storage system.

6. The computer program product of claim 5 further comprising:

caching results of a determination of whether a storage system which includes the primary and secondary storage systems have the capability to perform split data migration;

receiving a further migration command from a host to migrate a unit of data to the migration target storage system; and in response to the further migration command, determining whether the storage system has the capability to perform split data migration as a function of cached determination results.

7. The computer program product of claim 1 further comprising:

receiving a migration command from a host to migrate the unit of data to the migration target storage system; and in response to the migration command:

the primary storage system migrating data of the first subunit of the primary copy of the unit of data from the primary storage system as the first object to migration target storage system;

the primary storage system issuing a separate object migration command to the secondary storage system;

in response to the separate object migration command, the secondary storage system migrating data of the second subunit of the secondary copy of the unit of data from the secondary storage system as the second object to the migration target storage system;

upon completion of the migration of the second subunit of the secondary copy of the unit of data from the secondary storage system to the migration target storage system, the secondary storage system reporting in a completion report to the primary storage system, completion of the migration of the second subunit of the secondary copy of the unit of data from the secondary storage system to the migration target storage system; and upon receipt of the completion report from the secondary storage system, and upon completion of the migration of the first subunit of the primary copy of the unit of data from the primary storage system to the migration target storage system, the primary storage system reporting in a completion report to the host, completion of migration of the unit of data to the migration target storage system.

8. A method, comprising:

copying data of a unit of data from primary storage system to secondary storage system to form a primary copy of the unit of data stored at the primary storage system and a secondary copy of the unit of data stored at the secondary storage system; and performing split data migration including:

splitting the primary copy of the unit of data stored at the primary storage system into subunits of data including first and second subunits of the primary copy of the unit of data stored at the primary storage system;

splitting the secondary copy of the unit of data stored at the secondary storage system into subunits of data including first and second subunits of the secondary copy of the unit of data stored at the secondary storage system data;

migrating data of the first subunit of the primary copy of the unit of data from the primary storage system as a first object to a migration target storage system; and migrating data of the second subunit of the secondary copy of the unit of data from the secondary storage system as a second object to the migration target storage system so that all of the data of the unit of data is migrated to the migration target storage system as separate objects including the first object containing data of the first subunit of the primary copy of the unit of data migrated from the primary storage system and the second object containing data of the second subunit of the secondary copy of the unit data migrated from the secondary storage system.

9. The method of claim 8 wherein the splitting of the primary and secondary copies of the unit of data into the first and second subunits is a function of utilization rate of the primary storage system.

10. The method of claim 9 further comprising comparing the utilization rate of the primary storage system to a standard and wherein the splitting of the primary and secondary copies of the unit of data into the first and second subunits increases the size of the second subunit of data relative to the first subunit of data if the utilization rate of the primary storage system is high relative to the standard.

11. The method of claim 9 further comprising comparing the utilization rate of the primary storage system to a standard and wherein the splitting of the primary and secondary copies of the unit of data into the first and second subunits of data maintains a migration rate of the second object relative to the first object as substantially equal if the utilization rate of the primary storage system is low relative to the standard.

12. The method of claim 8 further comprising:

receiving a migration command from a host to migrate the unit of data to the migration target storage system; and in response to the migration command, determining whether a storage system which includes the primary and secondary storage systems has a capability to perform split data migration including:

determining whether the unit of data has been mirrored from the primary storage system to the secondary storage system to form the primary copy of the unit of data stored at the primary storage system and the secondary copy of the unit of data stored at the secondary storage system; and determining whether the primary and secondary storage systems are each coupled to the same migration target storage system.

13. The method of claim 12 further comprising:

caching results of a determination of whether a storage system which includes the primary and secondary storage systems have the capability to perform split data migration;

receiving a further migration command from a host to migrate a unit of data to the migration target storage system; and in response to the further migration command, determining whether the storage system has the capability to perform split data migration as a function of cached determination results.

14. The method of claim 8 further comprising:

receiving a migration command from a host to migrate the unit of data to the migration target storage system; and in response to the migration command:

the primary storage system migrating data of the first subunit of the primary copy of the unit of data from the primary storage system as the first object to migration target storage system;

the primary storage system issuing a separate object migration command to the secondary storage system;

in response to the separate object migration command, the secondary storage system migrating data of the second subunit of the secondary copy of the unit of data from the secondary storage system as the second object to the migration target storage system;

upon completion of the migration of the second subunit of the secondary copy of the unit of data from the secondary storage system to the migration target storage system, the secondary storage system reporting in a completion report to the primary storage system, completion of the migration of the second subunit of the secondary copy of the unit of data from the secondary storage system to the migration target storage system; and upon receipt of the completion report from the secondary storage system, and upon completion of the migration of the first subunit of the primary copy of the unit of data from the primary storage system to the migration target storage system, the primary storage system reporting in a completion report to the host, completion of migration of the unit of data to the migration target storage system.

15. A system for use with a host and a migration target storage system, comprising:

a primary storage system having a storage controller and at least one storage unit controlled by the storage controller and configured to store data, wherein the primary storage system has a processor;

a secondary storage system having a storage controller and at least one storage unit controlled by the storage controller of the secondary storage system, and configured to store data, wherein the secondary storage system has at least one processor; and a computer program product which comprises:
a computer readable storage medium having program instructions embodied therewith, the program instructions executable by a processor of the computer system to cause computer system operations, the computer system operations comprising:
copying data of a unit of data from primary storage system to secondary storage system to form a primary copy of the unit of data stored at the primary storage system and a secondary copy of the unit of data stored at the secondary storage system; and
performing split data migration including:
splitting the primary copy of the unit of data stored at the primary storage system into subunits of data including first and second subunits of the primary copy of the unit of data stored at the primary storage system;
splitting the secondary copy of the unit of data stored at the secondary storage system into subunits of data including first and second subunits of the secondary copy of the unit of data stored at the secondary storage system data;
migrating data of the first subunit of the primary copy of the unit of data from the primary storage system as a first object to a migration target storage system; and
migrating data of the second subunit of the secondary copy of the unit of data from the secondary storage system as a second object to the migration target storage system so that all of the data of the unit of data is migrated to the migration target storage system as separate objects including the first object containing data of the first subunit of the primary copy of the unit of data migrated from the primary storage system and the second object containing data of the second subunit of the secondary copy of the unit data migrated from the secondary storage system.

16. The system of claim 15 wherein the splitting of the primary and secondary copies of the unit of data into the first and second subunits is a function of utilization rate of the primary storage system.

17. The system of claim 16 wherein the computer system operations further comprise comparing the utilization rate of the primary storage system to a standard and wherein the splitting of the primary and secondary copies of the unit of data into the first and second subunits increases the size of the second subunit of data relative to the first subunit of data if the utilization rate of the primary storage system is high relative to the standard.

18. The system of claim 16 wherein the computer system operations further comprise comparing the utilization rate of the primary storage system to a standard and wherein the splitting of the primary and secondary copies of the unit of data into the first and second subunits of data maintains a migration rate of the second object relative to the first object as substantially equal if the utilization rate of the primary storage system is low relative to the standard.

19. The system of claim 15 wherein the computer system operations further comprise:
receiving a migration command from a host to migrate the unit of data to the migration target storage system; and
in response to the migration command, determining whether a storage system which includes the primary and secondary storage systems has a capability to perform split data migration including:
determining whether the unit of data has been mirrored from the primary storage system to the secondary storage system to form the primary copy of the unit of data stored at the primary storage system and the secondary copy of the unit of data stored at the secondary storage system; and
determining whether the primary and secondary storage systems are each coupled to the same migration target storage system.

20. The system of claim 19 wherein the computer system operations further comprise:
caching results of a determination of whether a storage system which includes the primary and secondary storage systems have the capability to perform split data migration;
receiving a further migration command from a host to migrate a unit of data to the migration target storage system; and
in response to the further migration command, determining whether the storage system has the capability to perform split data migration as a function of cached determination results.

21. The system of claim 15 wherein the computer system operations further comprise:
receiving a migration command from a host to migrate the unit of data to the migration target storage system; and
in response to the migration command:
the primary storage system migrating data of the first subunit of the primary copy of the unit of data from the primary storage system as the first object to migration target storage system;
the primary storage system issuing a separate object migration command to the secondary storage system;
in response to the separate object migration command, the secondary storage system migrating data of the second subunit of the secondary copy of the unit of data from the secondary storage system as the second object to the migration target storage system;
upon completion of the migration of the second subunit of the secondary copy of the unit of data from the secondary storage system to the migration target storage system, the secondary storage system reporting in a completion report to the primary storage system, completion of the migration of the second subunit of the secondary copy of the unit of data from the secondary storage system to the migration target storage system; and
upon receipt of the completion report from the secondary storage system, and upon completion of the migration of the first subunit of the primary copy of the unit of data from the primary storage system to the migration target storage system, the primary storage system reporting in a completion report to the host, completion of migration of the unit of data to the migration target storage system.

* * * * *